United States Patent [19]

Levy et al.

[11] Patent Number: 4,865,926
[45] Date of Patent: Sep. 12, 1989

[54] HYDROGEN FUEL REFORMING IN A FOG COOLED FUEL CELL POWER PLANT ASSEMBLY

[75] Inventors: Alexander H. Levy, Bloomfield; Ronald J. Wertheim, Hartford, both of Conn.

[73] Assignee: International Fuel Cells Corporation, South Windsor, Conn.

[21] Appl. No.: 236,091

[22] Filed: Aug. 24, 1988

[51] Int. Cl.$^4$ ............................................. H01M 8/06
[52] U.S. Cl. ........................................ 429/20; 429/17
[58] Field of Search .............................. 429/17, 19, 20

[56] References Cited

U.S. PATENT DOCUMENTS 4,678,723  7/1987  Wertheim .............................. 429/17

Primary Examiner—Donald L. Walton

[57] ABSTRACT

The power section of a phosphoric acid fuel cell power plant is cooled by injection of water droplets or fog into the anode gas stream exhaust, wherein the water droplets are vaporized. The anode exhaust with the water vapor therein is then split with a portion thereof being directed to the burner in the catalytic reformer to be consumed by the reformer burner. The remainder of the anode exhaust is routed to the reformer inlet where it provides the water necessary for the reforming reaction. The fog is produced by condensation of water out of the exhaust from a turbocompressor which compresses the air supply for the cathode side of the power section.

4 Claims, 1 Drawing Sheet

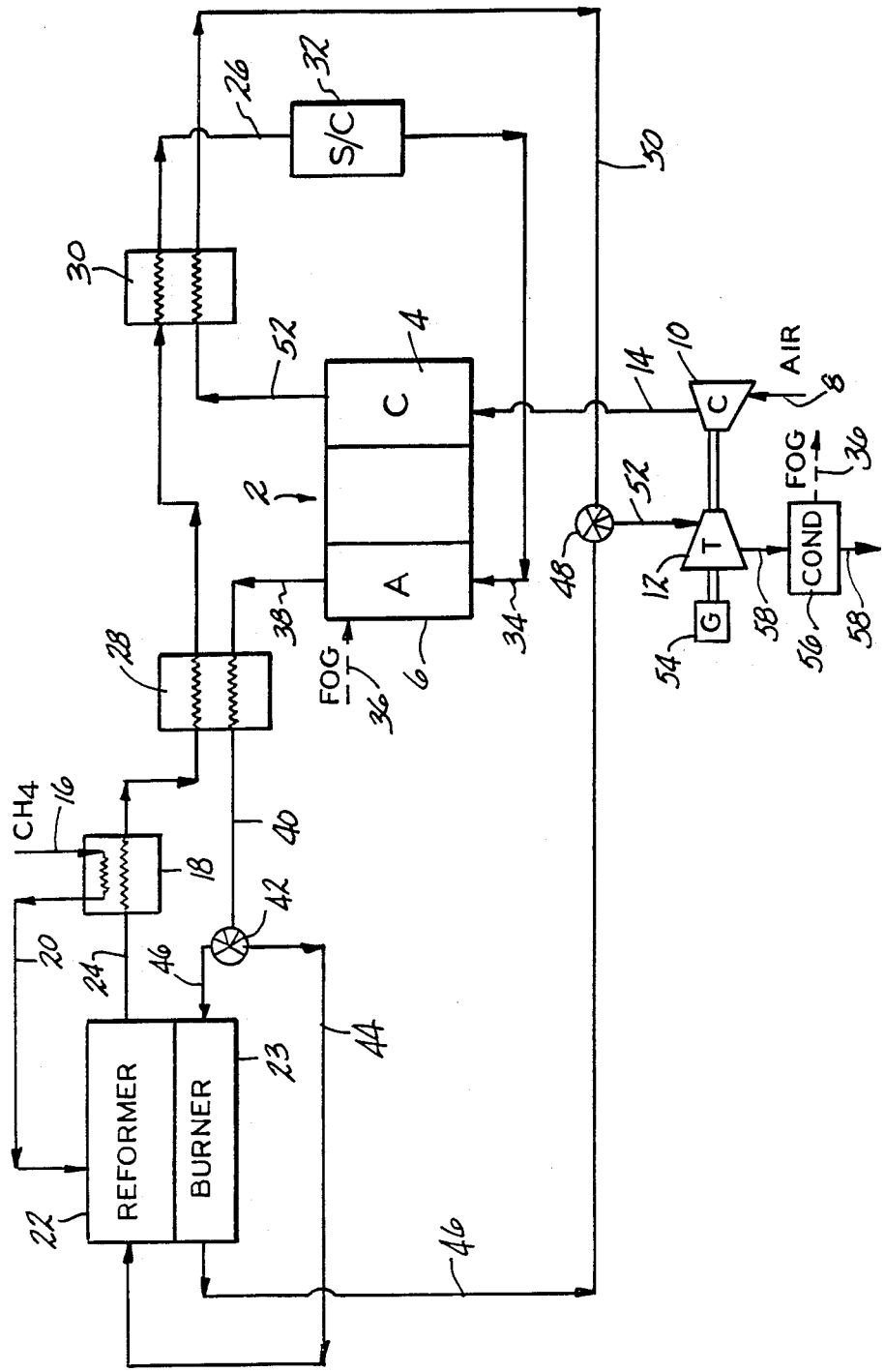

4,865,926

HYDROGEN FUEL REFORMING IN A FOG COOLED FUEL CELL POWER PLANT ASSEMBLY

TECHNICAL FIELD

This invention relates to a phosphoric acid fuel cell power plant, and more particularly, to such a power plant which utilizes water entrained in the anode gas to cool the power section, and anode exhaust as a source of water for hydrocarbon fuel reforming.

BACKGROUND ART

The power section of a fuel cell power plant will typically be cooled with a recirculating stream of water. The water will be fed through coolant passages in the power section and will be heated therein to a two phase water/steam mixture. The water/steam mixture leaving the power section will then be directed to a steam separator wherein the water and steam in the mixture will be separated from each other. The steam thus recovered will then be routed to the hydrocarbon gas reforming portion of the plant to serve as a reactant for the catalytic reforming of a raw hydrocarbon fuel to a hydrogen rich fuel gas suitable for use in the fuel cell anodes. This type of cooling system requires the use of the aforesaid steam separator, and also requires a water treatment subsystem since the water from the steam separator will be recirculated back through the cooling system. It also requires a separate network of coolant passages in the power section.

It has also been proposed to cool fuel cell power plant power sections by evaporating a water constituent which has been entrained in a gas stream. The gas steam could be an air stream routed through a separate cooling passage section, or it could be one of the reactant gas streams. U.S. Pat. No. 4,678,723 granted July 7, 1987 to R. J. Wertheim discloses one such system. In the system described in the aforesaid patent, water fog is injected into the cathode exhaust, which is then routed through a cooling section in the power section wherein the water is vaporized. The exhaust from the cooling section which contains water vapor is then fed into an auto-thermal reformer.

DISCLOSURE OF INVENTION

This invention relates to a phosphoric acid fuel cell power plant which has a conventionally fired reformer and wherein the power section cooling is provided by water injected into the anode gas stream exhaust, where the water is vaporized. The injected water will preferably take the form of water droplets and will be referred to hereinafter as a "fog". The water vapor—bearing anode exhaust is then split with some being routed to the burner in the reformer where it is combusted to provide heat for the reforming reaction. The rest of the anode exhaust is routed to the reformer inlet whereby it provides a source of water for the reformer reaction. The system of this invention does not requires a network of separate cooling passages for the power section. The system of this invention has the same advantages of the system discussed in the aforesaid U.S. Pat. No. 4,678,723 but it does not require using an autothermal reformer. Since the water is used in the reforming reaction is not in the form of steam, the power section can be operated at higher internal pressures with resultant lower heat rates and attendant increased efficiency. Increased power density at lower cost is also provided. Slightly better cell performance results from the additional hydrogen found in the anode gas stream due to the use of the hydrogen-water vapor mixture used in the reforming process. The power section can be maintained in the range of 200 psia to 600 psia with a turbocompressor operated with a mixture of the reformer burner exhaust and the cathode exhaust.

It is therefore an object of this invention to provide a fuel cell power plant assembly which can be operated at higher internal pressures and lower heat rates for increased efficiency.

It is a further object of this invention to provide a power plant assembly of the character described which includes a conventional fired reformer.

It is another object of this invention to provide a power plant of the character described which does not use steam as a source of water for the reforming process.

These and other objects and advantages of the invention will become more readily apparent from the following detailed description of a preferred embodiment thereof when taken in conjunction with the accompanying drawing which is a schematic representation of a fuel cell power plant formed in accordance with the invention.

BEST MODE FOR CARRYING OUT THE INVENTION

The power section 2, or stack of the power plant, where the electrochemical reaction occurs, has a cathode side 4 and an anode side 6. It will be appreciated that the power section 2 is formed from a plurality of fuel cells stacked one atop the other, and that each cell will have a cathode and an anode. Cathode and anode reactants are typically fed into the cells from manifolds on the sides of the stack, with cross flow of the reactants occurring from one side inlet manifold to an opposite side outlet manifold. The cathode reactant will flow across the stack in one direction, and the anode reactant will flow across the stack in a direction, offset 90° from the cathode flow path. For convenience, the stack 2 is typically schematically represented as shown in the drawing. Air, which provides the oxygen reactant for the cathode side 4, enters the power plant through an air inlet line 8, and flows therefrom through a compressor 10 which is operated by a turbine 12. The air is compressed to a pressure in the range of about 200 psi to about 600 psi. A preferred operating pressure is about 400 psi. The compressed air flows into the cathode side 4 via the cathode inlet line 14.

A raw hydrocarbon fuel, such as methane, enters the system through line 16. The temperature of the incoming fuel is raised to about 600° F. in a heat exchanger 18, and the heated fuel then passes through line 20 and into the reformer vessel 22. The reformed hydrogen rich anode fuel leaves the reformer 22 via line 24 at a temperature of about 1045° F. and passes through the heat exchanger 18 where it gives off heat used to warm the incoming raw fuel. The temperature of the hydrogen rich fuel in the line 26 is lowered to about 425° F. by heat exchangers 18, 28 and 30, wherein the fuel passes through a shift converter 32 where the carbon monoxide concentration is reduced to 0.7% on a dry basis. Finally, the hydrogen rich fuel gas enters the anode side 6 of the power section 2 through the anode inlet line 34. The water fog coolant is injected into the fuel flow stream of the anode side 6 of the power section 2 through line 36. The water content of the fog coolant is vaporized in the anode side 6 to cool the power section 2 and to produce an anode exhaust stream in the outlet line 38 which anode exhaust stream contains unreacted hydrogen and water vapor. The hydrogen/water vapor anode exhaust flows through heat exchanger 28 and into line 40 at a temperature of about 723° F. From the line 40 the anode exhaust stream is split by a valve 42 so that about 47% thereof flows through line 44 into the reformer 22, and about 53% thereof flows through line 46 into the reformer burner 23 to be combusted therein to provide heat for operating the reformer 22. The water vapor in the stream in line 44 provides the water needed for the ongoing reforming reaction in the reformer 22. Exhaust gases from the reformer burner 23, which contain water vapor are routed through line 46 to valve 48 where the reformer burner exhaust gas is mixed with cathode exhaust from line 50. The cathode exhaust is a mixture of oxygen depleted air and entrained product water, which mixture is taken from the cathode side 4 of the power section 2 in a cathode exhaust line 52. The moist, oxygen depleted air is heated to a temperature of about 468° F. in the heat exchanger 30 before entering the line 50. The mixture of reformer burner exhaust gas and heated cathode exhaust gas, both of which carry water vapor, which is preferably at a pressure of about 400 psi and a temperature of about 919° F. is fed into the turbine 12 through line 52 to provide the energy to operate the turbine. As noted previously, the turbine 12 operates the air compressor 10, and also operate an electric generator 54, which generates current thereby adding to the total amount of electricity produced by the power plant. Exhaust from the turbine 12, which exhaust contains water vapor, is taken to a condenser 56 via line 58. The water content is condensed out of the turbine exhaust in the condenser 56. The condensed water is taken out of the condenser 56 as a water fog in line 36, which water fog is taken from the condenser 56, through the line 36 to the anode gas stream in the anode side 6 of the power section. Gases in the condenser 56 are exhausted therefrom through condenser outlet line 58.

It will be readily appreciated that the system of this invention is simplified due to the elimination therefrom of a separate water cooling loop associated with the power section, which in the prior art, heats cooling water to its boiling point in the power section to cool the cells. The system of this invention is operable at higher pressures due to the absence of steam therein, and thus will produce the higher power densities at low heat rates, as set forth in the aforesaid U.S. Pat. No. 4,678,723. This improved performance is achieved with the use of a conventionally fired reformer, and does not require the use of an autothermal reformer.

Since many changes and variations of the disclosed embodiment of the invention may be made without departing from the inventive concept, it is not intended to limit the invention otherwise than as required by the appended claims.

We claim:

1. A high pressure phosphoric acid fuel cell stack assembly comprising:
   (a) a stack of fuel cells for producing electricity, said stack including cathode means, anode means, and said stack being formed without a separate cooling system;
   (b) means for delivering a pressurized air supply to said cathode means;
   (c) means for delivering a hydrogen rich fuel gas to said anode means for electrochemically reacting with oxygen in the pressurized air to produce electricity and water;
   (d) first exhaust means for removing a mixture of oxygen-depleted air and product water from said cathode means;
   (e) means for delivering a water fog stream to said anode means for mixture with said hydrogen rich fuel gas, said water fog stream being evaporated in said anode means to cool the stack;
   (f) means for exhausting a mixture of hydrogen-depleted gas and water vapor from said anode means;
   (g) reformer means for reforming a raw hydrocarbon fuel to said hydrogen rich fuel gas; and
   h) means for delivering said mixture of hydrogen-depleted exhaust gas and water vapor to said reformer means to provide water for the reforming reaction.

2. The stack assembly of claim 1 wherein said means for delivering said mixture comprises first conduit means for delivering a portion of said mixture to a reformer burner means for combustion to provide heat for operating said reformer means and second conduit means for delivering the remainder of said mixture to said reformer means.

3. The stack assembly of claim 2 further comprising a turbocompressor for pressurizing said air supply, and conduit means for delivering exhaust from said reformer burner, and exhaust from said cathode means to said turbocompressor to operate the latter.

4. The stack assembly of claim 3 further comprising means for mixing said reformer burner exhaust and said cathode means exhaust prior to delivery to said turbocompressor.

* * * * *